3,207,733
HOMOPOLYMERS OF α-FLUOROSTYRENE AND PROCESS THEREFOR
James S. Noland, Greenwich, Conn., assignor to American Cyanamid Company, Stamford, Conn., a corporation of Maine
No Drawing. Filed Apr. 20, 1962, Ser. No. 188,954
6 Claims. (Cl. 260—91.5)

This invention relates to a process for polymerizing α-fluorostyrene. Still further this invention relates to polymers of α-fluorostyrene. Still further this invention relates to a process for polymerizing α-fluorostyrene comprising forming an aqueous emulsion of monomeric α-fluorostyrene by use of a nonionic emulsifying agent while holding the temperature at about 25° C. to about 70° C. and conducting the polymerization in the presence of a water soluble catalyst which releases free radicals under the conditions of polymerization, namely, at a pH of at least 7.

One of the objects of the present invention is to polymerize α-fluorostyrene. A further object of the present invention is to achieve the polymerization of α-fluorostyrene by utilizing the process of the present invention. These and other objects of the present invention will be discussed in greater detail hereinbelow.

The compound, α-fluorostyrene, is deemed to be a novel monomer and the details relating to the process for its preparation are covered in an application having the Serial No. 188,973, filed April 20, 1962, on behalf of John A. Sedlak, George C. Gleckler and Ken Matsuda. In said copending application, 1 mole of phenyl acetylene is reacted with 2 moles of hydrogen fluoride in the presence of a mercuric oxide impregnated activated charcoal catalyst resulting in the production of α,α-difluoroethylbenzene. Said α,α-difluoroethylbenzene is then thermally cracked to produce α-fluorostyrene.

α-Fluorostyrene, although seemingly similar to other α-halostyrenes such as α-chlorostyrene, does not have the same polymerization characteristic. α-Chlorostyrene, insofar as it is known, has never been polymerized to a polymer containing the theoretical amount of chlorine. Surprisingly enough, the process of the present invention when applied to α-fluorostyrene results in the polymerization of said monomer to a high molecular weight polymer containing the theoretical amount of fluorine. The instant process then is a significant departure from the prior art and produces novel and unexpected results. α-Chlorostyrene was not polymerized when subjected to the instant process.

The process of the present invention resides fundamentally in forming an aqueous emulsion of α-fluorostyrene. The monomer to water ratios may be varied from about 1% to 40% by weight, however, 10% to 20% is preferred based on the total weight of monomer and water. In forming this emulstion a nonionic emulsifying agent is used to the exclusion of other emulsifying agents such as the cationic and anionic emulsifying agents. These nonionic emulsifying agents are well known in the art and a substantial plurality of the same are commercially available. Poly ethers with hydroxy or phenolic groups are particularly suitable for this purpose. Reference is made to the text "Surface Active Agents and Detergents" by Schwartz, Perry and Berch, Interscience Publishers, 1958, and particularly chapter 4 thereof which describes in significant detail the nonionic surfactants and method of preparation and possible sources. The amount of the nonionic emulsifier may be varied from about 1% to about 5% by weight based on the weight of monomer and preferably from about 3% to 4% same basis.

The polymerization of α-fluorostyrene should be carried out in keeping with the concept of the present invention at a pH from neutral to alkaline. More particularly the pH should be maintained at least at 7, and preferably between about 7.5 and 9. Higher pHs such as 12 may be utilized whenever the catalyst selected is operative at these higher pH values.

The catalyst material used in carrying out the process of the present invention should be a water soluble material which is capable of releasing free radicals at a pH of at least 7. These catalytic materials may be used either singly or in combination with one another and would be used in conventional catalytic quantities such as about 0.01% to about 5% by weight based on the total weight of the monomer and preferably from about 0.1% to about 1% by weight same basis. Among the catalysts which may be used in the process of the present invention are potassium persulfate, sodium persulfate, ammonium persulfate, or mixtures of said persulfates with a tertiary amine such as trimethanolamine, triethanolamine, tripropanolamine, β-dimethylaminopropionitrile, dimethylaminoacetonitrile and the like. Additionally, one may use as the catalyst system a mixture of cumene hydroperoxide with sodium nitroprusside. All of these catalyst systems function for the purpose of the present invention because they are water soluble and do release free radicals on the neutral to alkaline pH side.

In order to insure the maintenance of the pH value on the neutral to alkaline side, it is necessary or at least desirable to utilize a buffering agent of which a substantial plurality are well known in the art. Aqueous buffers of the desired pH may be prepared according to the directions for Clark and Lubes Buffer Mixtures as described in Lange's Handbook of Chemistry, 7th Ed., page 1128.

The polymers prepared according to the concept of the present invention may be utilized as molding compositions, adhesives, coatings and the like.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with a stirrer, thermometer, reflux condenser and inert gas inlet and outlet tubes there is introduced 20 parts of water buffered at pH 7 and 0.11 part of octylphenoxy polyethoxyethanol (Triton X–305), a nonionic emulsifier. The buffer added is 20 parts of an aqueous solution of a buffer prepared by blending 29.6 parts of a 0.1 N aqueous solution of sodium hydroxide with 50 parts of a 0.1 molar aqueous solution of potassium acid phosphate, the total blend diluted with enough water to make a solution of 100 parts. The system is swept with prepurified nitrogen gas for 15 minutes while stirring constantly. The nitrogen flow is discontinued and 2.2 parts of α-fluorostyrene monomer is added and the stirring is continued. When the emulsion has been formed it takes on a milky appearance and then 0.03 part of potassium persulfate is added. The system is maintained at 50° C. for a period of 20 hours with constant agitation. Thereupon the reaction mixture is poured into 500 parts of methanol and the polymer precipitates. The precipitate is filtered and washed with fresh methanol. The polymer is dissolved in benzene and reprecipitated in methanol. The polymer is then dried to give a yield of 0.45 part. The polymer is a white, fluffy solid having a softening point of 145–150° C. and an intrinsic viscosity in benzene at 30° C. of 0.84 dl/g. On the basis of the intrinsic viscosity the molecular weight is determined to be about 200,000–220,000 weight.

*Analysis.*—Calculated for $C_8H_7F$: C, 78.69; H, 5.78; F, 15.56. Found: C, 78.71; H, 6.21; F, 15.37.

*Example 2*

Into a suitable reaction vessel equipped as in Example 1 there is introduced 20 parts of an aqueous solution buffered at pH 9 and 0.11 part of octylphenoxy polyethyloxyethanol (Triton X–305), a nonionic emulsifier. The system was buffered by adding 20 parts of an aqueous solution of a blend of 21.3 parts of a 0.1 N sodium hydroxide solution and 50 parts of 0.1 molar boric acid solution, the total blend being diluted with enough water to make a total solution of 100 parts. The reaction vessel is flushed with nitrogen gas as before and 2.2 parts of α-fluorostyrene are introduced. The polymerization is initiated by adding 0.035 part of ammonium persulfate and 0.22 part of triethanolamine. The polymerization is contained for 8 hours at 35° C. The polymer is isolated and dried as in Example 1 and consists of 1.3 parts. The polymer had an infrared spectrum substantially identical with the analytically pure sample disclosed in the previous example. The intrinsic viscosity in benzene at 30° C. is 1,2 dl/g. revealing a molcular weight of about 300,000 weight average molecular weight.

*Example 3*

Example 1 is repeated in substantially all details except that the system is adjusted to a pH of 12 and the polymerization is initiated by adding a mixture of 0.02 part of cumene hydroperoxide and 0.06 part of sodium nitroprusside. The yield of the polymer after 8 hours was about 1 part. The product was white and fluffy as before. The intrinsic viscosity in benzene at 30° C. was 0.9 dl/g. indicating a molecular weight of about 250,000.

I claim:

1. A process for homopolymerizing α-fluorostyrene comprising forming an aqueous emulsion of monomeric α-fluorostyrene by use of a nonionic emulsifying agent, adjusting the pH to at least 7 and carrying out the polymerization in the presence of a water soluable catalyst which releases free radicals on the neutral to alkaline side of the pH scale while maintaining a temperature of about 25° C. to 70° C. thereby producing a normally solid homopolymer of α-fluorostyrene having a softening point of 145–150° C.

2. The process according to claim 1 wherein the catalyst is potassium persulfate.

3. The process according to claim 1 wherein the catalyst system is a mixture of ammonium persulfate and triethanolamine.

4. The process according to claim 1 wherein the catlyst system is a mixture of cumene hydroperoxide and sodium nitroprusside.

5. A normally solid homopolymer of α-fluorostyrene having a softening point of about 145–150° C.

6. A normally solid homopolymer of α-fluorostyrene having a softening point of about 145–150°C. and an intrinsic viscosity in benzene at 30° C. of from about 0.84 dl/g. to about 1.2 dl/g.

References Cited by the Examiner

UNITED STATES PATENTS 2,651,627  9/53  Prober _____ 260—65

OTHER REFERENCES

Prober: Journal of the American Chemical Society, 75 (pp. 968–973), February 1953.

Bergman et al.: Journal of the American Chemical Society, vol. 80 (pp. 4540–43), September 1958.

JOSEPH L. SCHOFER, *Primary Examiner.*

JOSEPH R. LIBERMAN, *Examiner.*

UNITED STATES PATENT OFFICE
CERTIFICATE OF CORRECTION

Patent No. 3,207,733                          September 21, 1965

James S. Noland

It is hereby certified that error appears in the above numbered patent requiring correction and that the said Letters Patent should read as corrected below.

Column 3, line 19, for "contained" read -- continued --; line 24, for "1,2 dl/g." read -- 1.2 dl/g. --; column 4, line 15, for "catlyst" read -- catalyst --.

Signed and sealed this 5th day of April 1966.

(SEAL)
Attest:

ERNEST W. SWIDER  
Attesting Officer

EDWARD J. BRENNER  
Commissioner of Patents